United States Patent

Milo

[15] 3,670,384

[45] June 20, 1972

[54] BRACKET FOR CENTERING CAPPED PIPE IN MANHOLES

[72] Inventor: August Milo, 1015 Schliefer Road, Hillside, N.J. 07205

[22] Filed: Jan. 26, 1971

[21] Appl. No.: 109,772

[52] U.S. Cl. ..................................................29/200 J
[51] Int. Cl. ......................................................B23p 19/00
[58] Field of Search................29/200 J, 200 P, 200 R, 203 P

[56] References Cited

UNITED STATES PATENTS 3,422,519   1/1969   Fehlman..............................29/200 P

*Primary Examiner*—Thomas H. Eager
*Attorney*—Peter J. Gaylor

[57] ABSTRACT

A centering bracket mountable in a manhole body for centering a pipe end smaller than the body and having a cap wider than the pipe, comprises four arms connected laterally to form a square having a size just adequate to accommodate the pipe end. Each of the arms has an extension of even length terminating in a bent portion designed to fit in frictional contact against the manhole body. One of the arms is removable so as to enable insertion of the pipe end cap in the larger space between the opened square and the body. Connecting means, such as thumb screws, are provided to connect the removable arm to form the square after the pipe cap has been passed through and the pipe end has been centered in the square.

2 Claims, 3 Drawing Figures

PATENTED JUN 20 1972 3,670,384

INVENTOR.
AUGUST MILO
BY
ATTORNEY

BRACKET FOR CENTERING CAPPED PIPE IN MANHOLES

BACKGROUND OF THE INVENTION

This invention deals with a centering bracket for centering manhole bodies or skirts used as entries to underground tank fill pipes or gage pipes, such as those employed in gasoline stations.

When underground tanks, such as a gasoline tank, for example, are installed in a gasoline station site, a hole is dug in which the tank is to be buried. Usually, such a tank has two vertical pipes leading to the ground surface. The larger one, located near one end of the tank, is a fill pipe through which gasoline is flowed from a tank truck, for example. The smaller pipe is usually near the other end of the tank, and it is used for inserting a gage stick to determine the height of the liquid level in the tank.

After the tank and auxilliary connections have been installed, the dirt is filled to near ground level, except for the vicinities of the vertical pipes. Both vertical pipes have caps which are wider than the pipes and which are attached to the pipe ends to prevent entry of dirt and other foreign matter. The pipes also have a wider adapter onto which the cap is attached.

Thereafter, the manhole bodies are installed around the vertical pipes. Since the pipes must be disposed in the center of the manholes, a centering bracket is used within the manhole body. In the past, to insert the centering bracket, it has been necessary to remove the adapter and the cap from the pipe end. Then, the manhole body is raised above each pipe until the center hole of the bracket is directly beneath, and the body is lowered and the bracket is fitted over the pipe, whereupon the latter is centered with respect to the manhole.

The next step involves filling and tamping the dirt around each manhole, and a form is made on the surface adjacent the manholes, after which the surface of the ground is black-topped up to the form. Finally, concrete is poured to produce a pad in the form area while the manhole covers are on. The centering bracket is left in the manhole. If desired, the black-topping may be done after the concrete is poured.

Prior art centering brackets consist of a metal ring of diameter slightly greater than that of the pipe to be circumscribed, and three laterally-radiating arms extending to the side of the manhole body which abut in frictional contact with the inside of the body. The main disadvantage to the use of such brackets is the necessity of removing the adapter and caps and the possibility of accidental introduction of foreign matter into the pipes, and tank, during the manhole installation. Furthermore, the work on the pipe must be done by a licensed plumber or pipefitter who is usually away from the job at that time, and who is required to return from the work, thus entailing additional delay and expense.

SUMMARY OF THE INVENTION

According to the present invention, a centering bracket is provided by connecting four arms laterally to form a square having a size just adequate to accommodate the pipe. Each of the arms has an extension of even length terminating in a bent portion which fits in frictional contact with the wall of the manhole body. However, one of the arms is removable so as to enable the insertion of the pipe end adapter and cap in the larger space between the opened square and the body. After the adapter and cap are passed through, the pipe is centered in the square and the removable arm is replaced and connected to the other arms.

Such a centering means eliminates the labor involved in removing and replacing the adapter and cap. It also prevents entry of foreign matter into the otherwise open pipe end. And, it eliminates the need of a licensed plumber or pipefitter and the delay and expense thereby involved.

BRIEF DESCRIPTION OF THE DRAWINGS

The invention will be more readily understood by reference to the accompanying drawings which describe a preferred embodiment, and in which.

The same numerals refer to the same or similar parts in the various figures.

DESCRIPTION OF THE PREFERRED EMBODIMENTS

Figure 1:
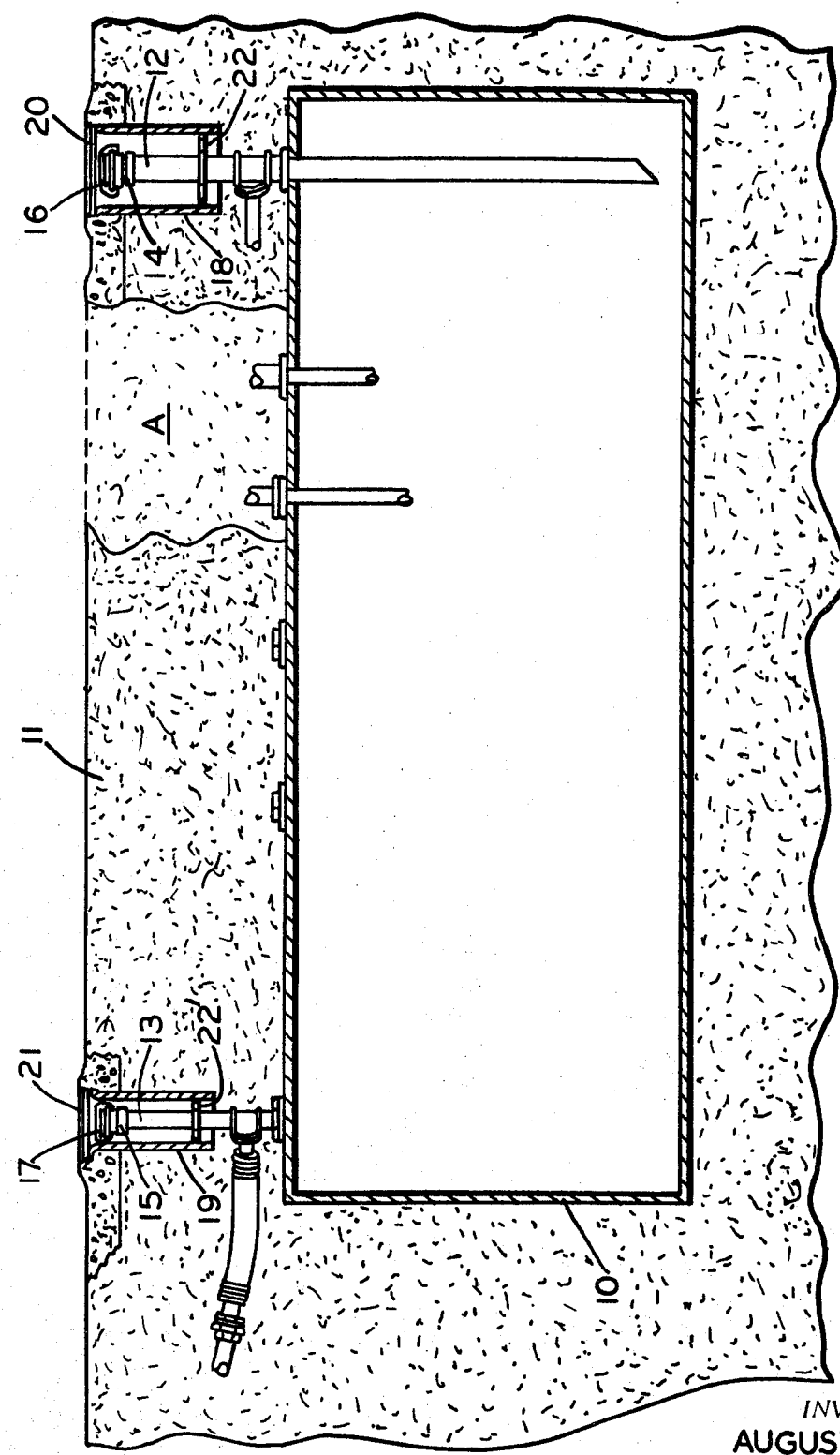
FIG. 1 is a diagrammatic vertical elevational view, partly in cross-section, of a gasoline station installation of an underground tank and vertical access pipes, as well as manholes and centering brackets, as completely installed.

Referring again to the drawings, and first to FIG. 1, numeral 10 represents, generally, an underground tank, such as that used for storing gasoline in a dispensing station, disposed under surface 11 of the ground. Projecting upwardly from one top end of tank 10 is a fill pipe 12 through which gasoline is fed from a tank truck, for example, for refilling tank 10. Near the other end of the top of tank 10 is another vertically-directed smaller pipe 13 used for inserting a gage stick therein.

Both pipes 12 and 13 are provided with adapters 14 and 15, respectively, and caps 16 and 17, respectively. Disposed around pipes 12 and 13 are manhole bodies or skirts 18 and 19, respectively. The centering brackets 22 and 22', which are the subject of the present invention, are disposed around pipes 12 and 13, respectively, and their extremities abut, in frictional contact, the inner walls of bodies 18 and 19, respectively, of the manholes. Certain equipment for dispensing and other purposes, which are not necessary for the present description, and which normally would be positioned in area A of FIG. 1, have been ommitted for the sake of simplification and clarity.

Figures 2, 3:
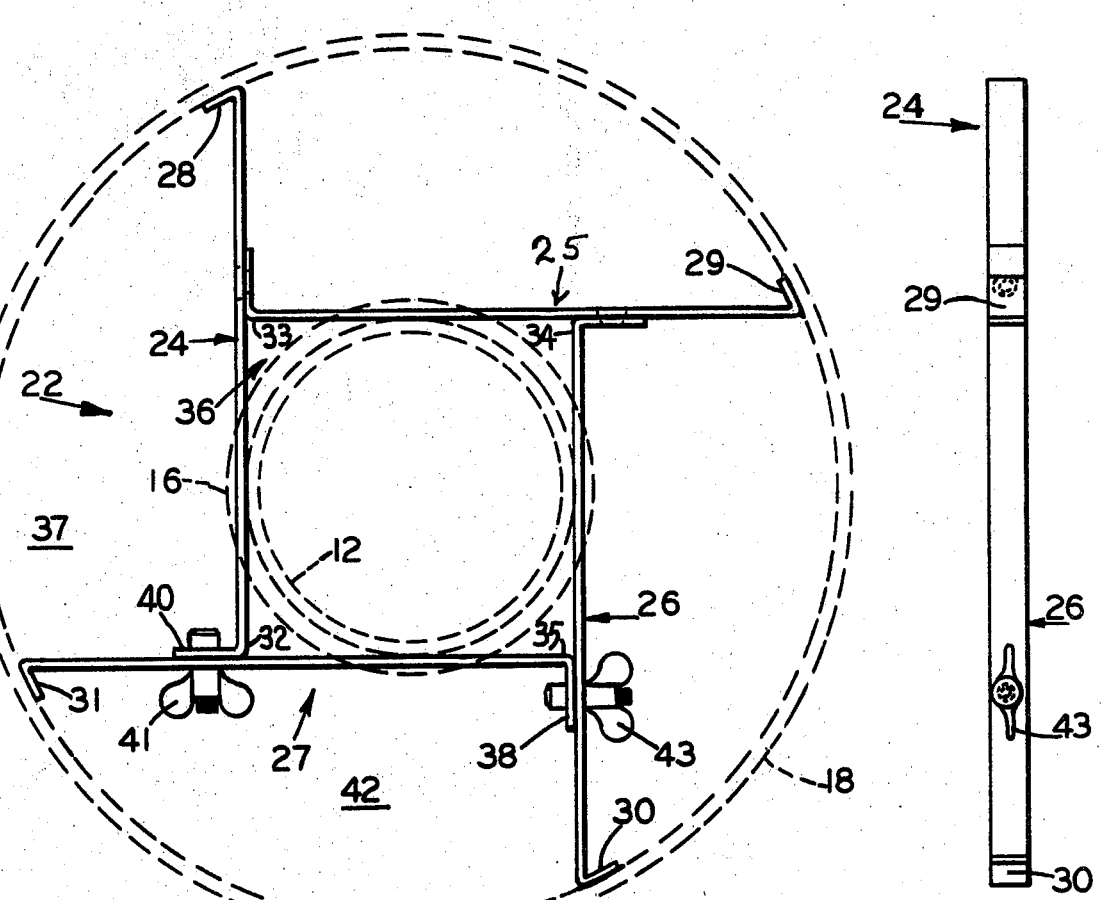
FIG. 2 depicts a top or plan view of the centering bracket of the present invention.
FIG. 3 illustrates a side view of the bracket shown in FIG. 2.

The centering bracket is shown in greater detail in FIGS. 2 and 3. It will be noted that the bracket, which is indicated generally as 22, consists of three arms 24, 25, and 26, which are permanently affixed to each other, and a fourth arm 27, which is removable. The distance between arms 24 and 26 approximates roughly the outer diameter of the pipe to be centered, such as pipe 12, for example. Also, the distance between arms 25 and 27 also approximates roughly the outer diameter of pipe 12. Arms 24, 25, 26 and 27 have one end 28, 29, 30 and 31, respectively, bent to fit the internal periphery of manhole body 18, and are designed to fit in frictional contact therewith. The other ends 32, 33, 34 and 35, respectively, of the arms are connected to the inner portions of their adjacent arms to provide a centrally-disposed square space 36 in which fits closely the pipe 12. The outer space 37 between pipe 12 and body 18 is wide enough to permit entry therein of a human hand, for example.

End 33 of arm 25 is affixed to arm 24 by welding, or the like. End 34 of arm 26 is attached to arm 25 similarly, so that the structure is stable and self-supporting without arm 27. The latter arm is removable and its and 35 has a bent portion 39 which is attached to arm 26 by means of a thumbscrew 43. Likewise, the end 32 of arm 24 has a bent portion 40 which is attached to arm 27 by thumbscrew 41.

As is apparent from FIG. 2, the adapter and cap 16 of pipe 12 would not fit into opening 36 unless some other provision for their entry is made. According to the present invention, before bracket 22 is first inserted in body 18, arm 27 is removed by unscrewing nuts 43 and 41. In such case, the manhole body 18, after it is raised over pipe 12 for installation, is lowered over space 42 which, together with space 36 (with arm 27 removed), offer a larger area in which adapter and cap 16 may be accommodated. After bracket 22 in body 18 has thus been lowered, body 18 is swung so as to center pipe 12 in square space 36. When this takes place, adapter and cap 16 are disposed over bracket 22. Then, arm 27 is inserted under adapter 14 and fastened to arm end 40 and arm 26 by nuts 41 and 42, respectively, whereupon pipe 12 is effectively centered in body 18.

The arms may be made from metal strips one-half inch wide and one-sixteenth inch thick. However, a hard plastic may be employed in lieu of metal. Also, arm 27 may be connected to the other arms by means of clamps, staples, or the like. Although bracket 22 is generally installed near the bottom of body 18, it may be placed therein wherever desired.

I claim:

1. A centering bracket mountable in a manhole body for centering a pipe end smaller than said body, said pipe end terminating in a cap wider than said pipe end, comprising:

four arms connected laterally in a manner so as to form a square having a size just adequate to accommodate a pipe end, each of said arms having an extension of even length terminating in a bent portion designed to fit in frictional contact against said body, one of said arms being removable so as to enable insertion of a pipe end cap in the larger space between said opened square and said body, and connecting means for connecting said removable arm to said other arms to form said square after a pipe end cap has been passed therethrough and the pipe end has been centered in said square.

2. A centering bracket, according to claim 1, in which said arm ends are laterally bent and said connecting means are thumb screws.

* * * * *